(12) United States Patent
Haralampu et al.

(10) Patent No.: US 7,882,732 B2
(45) Date of Patent: Feb. 8, 2011

(54) APPARATUS FOR MONITORING TIRE PRESSURE

(76) Inventors: Stephen George Haralampu, 51 Washington St., Belmont, MA (US) 02478; Christopher Hume Reynolds, 22 Draper Rd., Wayland, MA (US) 01778-2109; David Vogel, 41 Delapa Cir., Westwood, MA (US) 02090; Jerrold Zindler, 180 Clark Rd., Brookline, MA (US) 02445

( * ) Notice: Subject to any disclaimer, the term of this patent is extended or adjusted under 35 U.S.C. 154(b) by 1221 days.

(21) Appl. No.: 10/836,321

(22) Filed: Apr. 30, 2004

(65) Prior Publication Data

US 2005/0000278 A1 Jan. 6, 2005

Related U.S. Application Data

(60) Provisional application No. 60/467,498, filed on May 2, 2003.

(51) Int. Cl.
*B60C 23/02* (2006.01)

(52) U.S. Cl. ................................... 73/146.5
(58) Field of Classification Search ...................... None
See application file for complete search history.

(56) References Cited

U.S. PATENT DOCUMENTS

2005/0268721 A1* 12/2005 Rudkin ..................... 73/702

* cited by examiner

*Primary Examiner*—Andre J Allen
(74) *Attorney, Agent, or Firm*—Ohlandt, Greeley, Ruggiero & Perle, LLP

(57) ABSTRACT

An apparatus for monitoring tire pressurization state in a tire has a magneto-mechanical pressure sensor in or on the tire and an electromagnetic excitation system. The electromagnetic excitation system is for interrogating the magneto-mechanical pressure sensor. The apparatus also has a receiver. The receiver is for receiving information from the electromagnetic excitation system. The apparatus also has a data interpretation system for translating the received information into the tire pressurization state. The data interpretation system is connected to a display. The display communicates the tire pressurization state to an operator.

11 Claims, 15 Drawing Sheets

APPARATUS FOR MONITORING TIRE PRESSURE

CROSS REFERENCE TO RELATED APPLICATIONS

This application claims priority to U.S. Provisional Patent Application Ser. No. 60/467,498 filed on May 2, 2003, which is herein incorporated by reference in its entirety.

BACKGROUND OF THE INVENTION

1. Field of the Invention

The present invention relates to an apparatus that monitors tire pressure. More particularly, the present invention relates to an apparatus that remotely excites a device in a tire, detects data from the device, and processes and displays the data as a tire pressure of the tire to a vehicle operator.

2. Description of the Related Art

On board tire pressure sensing devices are known in the art. The tire pressure sensing devices are a convenience to vehicle operators and also a safety feature that has been mandated by the National Highway Traffic Safety Administration (41 CFR Part 571) for reducing the incidence of accidents caused by under-inflated tires. In the final ruling issued by NHTSA, two basic systems for tire pressure monitoring were described. More particularly, direct and indirect pressure measurement devices were described.

The indirect tire pressure monitoring systems are found through the rotational speeds as measured by the vehicle's anti-lock braking system (ABS). Although this system has the advantage of using equipment already installed on many vehicles, there are at least two major problems. First, sensitivity is a problem. Second, the indirect tire pressure monitoring systems may not identify critical combinations of multiple under-inflated tires. Since the indirect tire pressure monitoring systems operate by comparing the rotation speeds of individual tires, if a vehicle's tires are uniformly under-inflated, the system will not detect any rotational difference.

Direct tire pressure monitoring systems have sensitivity and an ability to resolve the inflation situation in each respective tire. A complication exists in accessing the information from within the rotating body of the tire. A direct electrical connection to any device becomes impractical because the tire rotates. The tire is also in an aggressive environment and any tire pressure monitoring system needs to be easily removable from the vehicle. Consequently, a practical approach for directly monitoring tire pressure is to use some sort of non-contact sensor device. An electronic pressure sensor coupled to a battery-powered radio frequency transmitter is known in the art. Tire pressure is relayed to the operator through a central receiver that identifies each tire and a pressurization state of the tire.

The main advantages of such direct tire pressure monitoring systems are increased sensitivity, an elimination of confounding variables present in the indirect tire pressuring monitoring system, and an ability to measure pressure in a stationary vehicle.

The direct tire pressure monitoring systems also suffer from a number of drawbacks. The direct tire pressure monitoring system is complex and expensive. The direct tire pressure monitoring system is also heavy and this device weight could potentially affect tire balance itself. Further, direct tire pressure monitoring systems have negative issues with regard to a battery life and battery disposal.

Remotely queried sensor systems unrelated to monitoring tire pressure are known in the art. An example of one such passive device is an electronic article surveillance (EAS) marker. The marker has a resonant circuit created by an antenna and a diode. Alternatively, the resonant circuit has the antenna with a capacitor combination. When interrogated by an alternating electromagnetic field, the circuit resonates. Thereafter, the circuit generates harmonics of the incident field. The receiving antenna detects either the generated harmonics or a depletion of an incident field. However, there are problems with such a system as the broad bandwidth and low amplitude of the harmonics makes these markers difficult to detect reliably.

In another example of the electronic article surveillance marker, the marker has a high magnetic permeability element. The high magnetic permeability element is placed adjacent to an element of higher magnetic coercivity. The high magnetic permeability element being adjacent to the element of higher magnetic coercivity resonates when interrogated by an alternating electromagnetic field due to nonlinear magnetic properties. The high magnetic permeability element adjacent to the element of higher magnetic coercivity generates harmonics of the interrogating frequency that are detected by a receiving coil.

For these electronic article surveillance markers, harmonics detection is difficult because of low amplitude. It is also complicated by the presence of other nonlinear ferromagnetic objects within the interrogation area, such as for example articles of magnetic recording material.

U.S. Pat. Nos. 4,510,489 and 4,510,490 to Anderson, III, et al., (hereinafter collectively as "Anderson") disclose magneto-mechanical electronic article surveillance. The marker has a thin strip of magnetostrictive ferromagnetic material. The magnetostrictive ferromagnetic material is placed adjacent to a magnetic element of higher coercivity (hereinafter "a magnetically hard element"). A non-alternating magnetic bias is placed on the magnetostrictive ferromagnetic material, and causes a mechanical strain in the magnetostrictive ferromagnetic material. This strain affects a resonant frequency of the magnetostrictive ferromagnetic material. The device is designed with appropriate dimensions and magnetic properties to mechanically resonate at a predetermined frequency when interrogated by an incident alternating magnetic field.

The resonance of the magnetostrictive ferromagnetic material can be detected electro-magnetically. The magneto-mechanical electronic article surveillance marker thus has advantages over previous electromagnetic markers of high sensitivity, high operating reliability and low manufacturing cost.

Magnetostriction is a property of a ferromagnetic material that changes volume when subjected to a magnetic field. When biased by a non-alternating magnetic field, magnetostrictive material stores energy via mechanical strain. This storage, affects the Young's modulus, E, of the material. Such magnetostrictive materials can be caused to resonate in an alternating magnetic field. The fundamental resonant frequency, FR, of a magnetostrictive ribbon can be described as a function F:

$$FR=F(L,E,\rho,\sigma)$$

where L is the ribbon length, $\rho$ is a density, and $\sigma$ is the Poisson ratio.

The relationship between the biasing non-alternating magnetic field strength, Young's modulus and the resonant frequency attained by the magnetostrictive strip is more complicated. Variations in the biasing magnetic field strength shift a frequency at which a maximum amplitude response is created (the resonant frequency). The system's resonant frequency can be designed by varying a geometry, one or more mechanical properties of the magnetostrictive material, and a strength of the biasing non-alternating magnetic field. Mechanical processes such as annealing can further manipulate one or more mechanical properties thereof.

U.S. Pat. No. 5,628,840 to Hasegawa discloses a composition of a magnetostrictive material with relatively linear magnetic behavior. Hasegawa further discloses a response of the composition in a resonant frequency versus a bias field. This magnetostrictive material has an advantage in magneto-mechanical electronic article surveillance markers of providing a relatively strong signal for harmonic detection.

A number of vibrations of the magnetostrictive element can be damped by a mechanical interaction. Therefore, the device preferably has the magnetostrictive element in a chamber and capable of movement. Also, the biasing magnet preferably is optimal so as not to attract the magnetostrictive element to impede free movement. U.S. Pat. No. 5,499,015 to Winkler, et al. (hereinafter "Winkler") discloses a resonant chamber. The resonant chamber is in a retail product or package.

U.S. Pat. No. 6,393,921 B1 to Grimes, et al. discloses a number of magnetostrictive materials in an assembly. The assembly measures pressure remotely, without any direct electrical hardwire connection. The assembly has a magnetostrictive strip that is held adjacent to a diaphragm. A magnetically hard element is connected to the diaphragm. As pressure changes, a deflection of the diaphragm occurs. This deflection changes the proximity of the magnetically hard element relative to the magnetostrictive element. The non-alternating magnetic bias on the magnetostrictive element changes which results in a change of the magneto-mechanical resonant frequency when subjected to an alternating magnetic field. The resonance can be remotely sensed by electro-magnetic devices.

Grimes discloses an embodiment where the magnetostrictive material is in a pressure sensor. The pressure sensor has the magnetostrictive materials and the magnetically hard element in a defined proximity to each other to provide a constant non-alternating magnetic biasing field applied to the magnetostrictive element. Grimes further discloses that the magnetostrictive element has a mechanically hardened region.

A density change in a gas surrounding the pressure sensor is associated with a pressure change. This pressure change thus causes a shift in resonant frequency. In both disclosed embodiments, the interrogating signal and receiver scans a number of frequencies. This scanning locates a resonant peak, and relates a frequency to a pressure datum. Also disclosed is a method which excites with an impulse and uses a fast Fourier transform (FFT) to find a number of resonant peaks.

However, there are known problems associated with such a pressure sensor. The magnetostrictive response is temperature sensitive, primarily due to a dependence on Young's modulus. Consequently, the pressure sensor of Grimes requires independent temperature correction. For the purpose of determining a thermal drift of the pressure sensor, a correcting temperature measurement can be made with another second test device similar to the pressure sensor, that is not exposed to any varying non-alternating bias field strength or that is not exposed to any changing gas density, and that is in the same thermal environment as the pressure sensor.

Accordingly, there is a need for a tire pressure monitoring system that eliminates one or more of the aforementioned drawbacks and deficiencies of the prior art.

SUMMARY OF THE INVENTION

It is an object of the present invention to provide a tire pressure monitoring apparatus that can easily be applied to and removed from a tire.

It is another object of the present invention to provide a tire pressure monitoring apparatus with a sensor in the tire that is not physically connected to a transmitter and receiver system located outside the tire.

It is still another object of the present invention to provide a tire pressure monitoring apparatus with a display that communicates a tire pressurization state of the tire to a vehicle operator.

It is yet another object of the present invention to provide a tire pressure monitoring apparatus that has a magneto-mechanical pressure sensor in the tire that is resilient to withstand the operational environment in the tire.

It is still yet another object of the present invention to provide a tire pressure monitoring apparatus that has a magneto-mechanical pressure sensor in a sidewall of the tire.

It is a further object of the present invention to provide a tire pressure monitoring apparatus that has a number of magneto-mechanical pressure sensors in one or more locations in the tire.

It is a still further object of the present invention to provide a tire pressure monitoring apparatus that has a magneto-mechanical pressure sensor that emits a data parameter from the tire.

It is a yet further object of the present invention to provide a tire pressure monitoring apparatus that has a magneto-mechanical pressure sensor that emits such a data parameter from the tire that can be received electro-magnetically.

It is a still yet further object of the present invention to provide a tire pressure monitoring apparatus that has a magneto-mechanical pressure sensor that does not require any power source such as a battery connected to the magneto-mechanical pressure sensor.

It is an additional object of the present invention to provide a tire pressure monitoring apparatus that has a magneto-mechanical pressure sensor that does not interfere with a performance characteristic of the tire.

These and other objects and advantages of the present invention are achieved by an apparatus for monitoring a tire pressurization state. The apparatus for monitoring the tire pressurization state in a tire has a magneto-mechanical pressure sensor and an electro magnetic excitation system. The electro-magnetic excitation system interrogates the magneto-mechanical pressure sensor. The apparatus further has a receiver for receiving information from the electro magnetic excitation system and a data interpretation system. The data interpretation system translates the received information into the tire pressurization state. The data interpretation system is connected to a display and the display communicates the tire pressurization state to an operator.

DETAILED DESCRIPTION OF THE INVENTION

Figure 1:
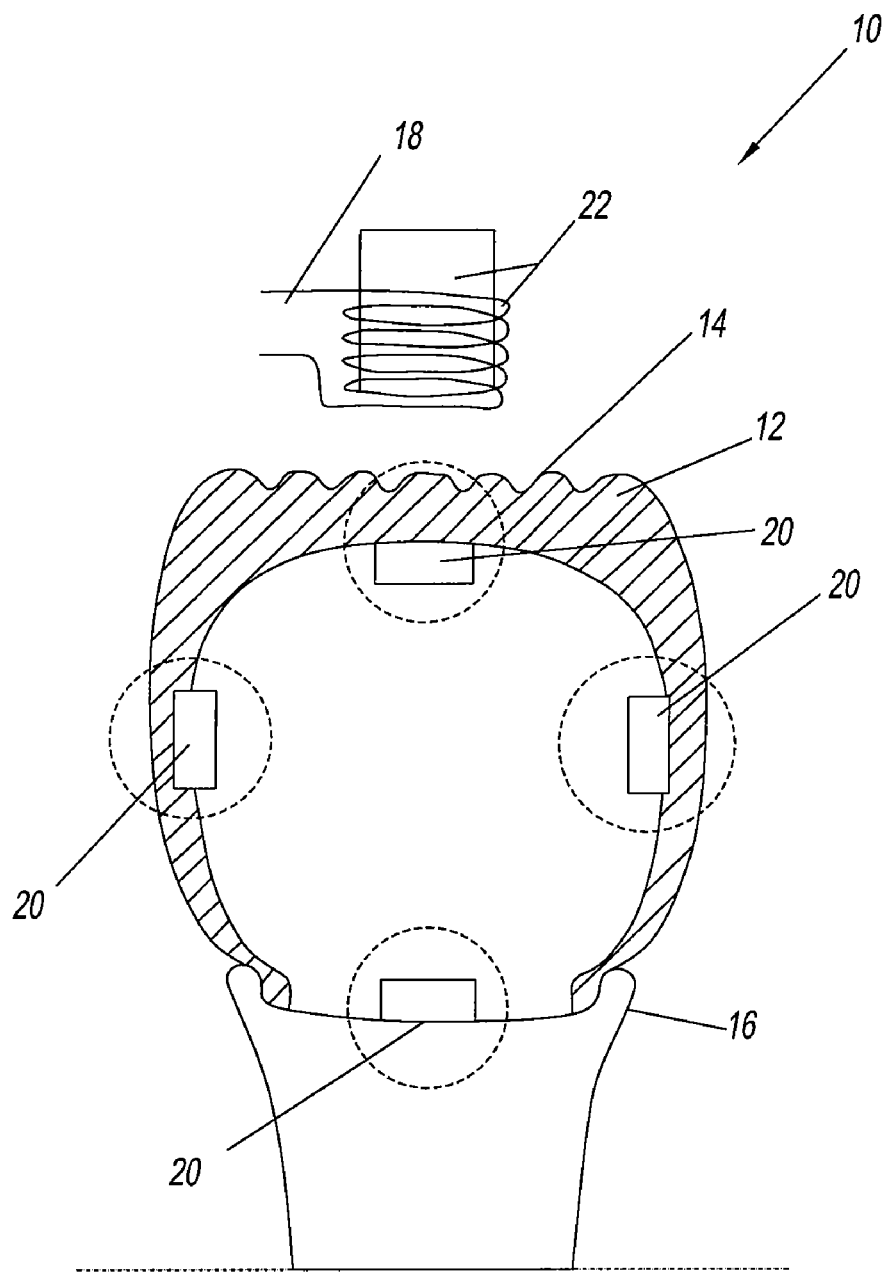
FIG. 1 is a sectional view of a tire wheel system having an apparatus for monitoring a tire pressurization state of the tire of the present invention.

Referring to the drawings and, in particular FIG. 1, the present invention is an apparatus generally referred to by reference numeral 10 for monitoring a tire pressurization state in a tire 12 for a transportation device. The transportation device may be any transportation device such as a motorcycle, a truck, an automobile, a sports utility vehicle, an aircraft, a scooter, a bicycle, a unicycle or any other device, using one or more pneumatic tires, that is known in the art.

The apparatus 10 preferably has high durability so as to be used in an aggressive operating environment and under strenuous operating conditions such as driving at high speeds. The apparatus 10 can preferably be jostled and undergo high stresses and high strains relative to strenuous driving conditions, without failure.

The tire 12 is made of rubber reinforced with cords of nylon, fiberglass, or other material and filled with compressed air. The tire 12, which shown in a cross sectional view, has a covering. The covering or outer edge perimeter 14 of the tire 12 preferably contacts ground. The tire 12 is further mounted on a wheel rim 16. The wheel rim 16, which is known in the art, is preferably positioned in a location that is adjacent to a compartment 18 in the transportation device. The tire 12 preferably supports the transportation device. In the preferred embodiment of use of the tire 12, namely on an automobile, the compartment 18 is preferably a wheel well or side panel of the automobile or any other suitable location near the tire 12. The compartment 18 preferably has an interior space therein. The compartment 18 preferably receives one or more components of the apparatus 10.

Figure 11:
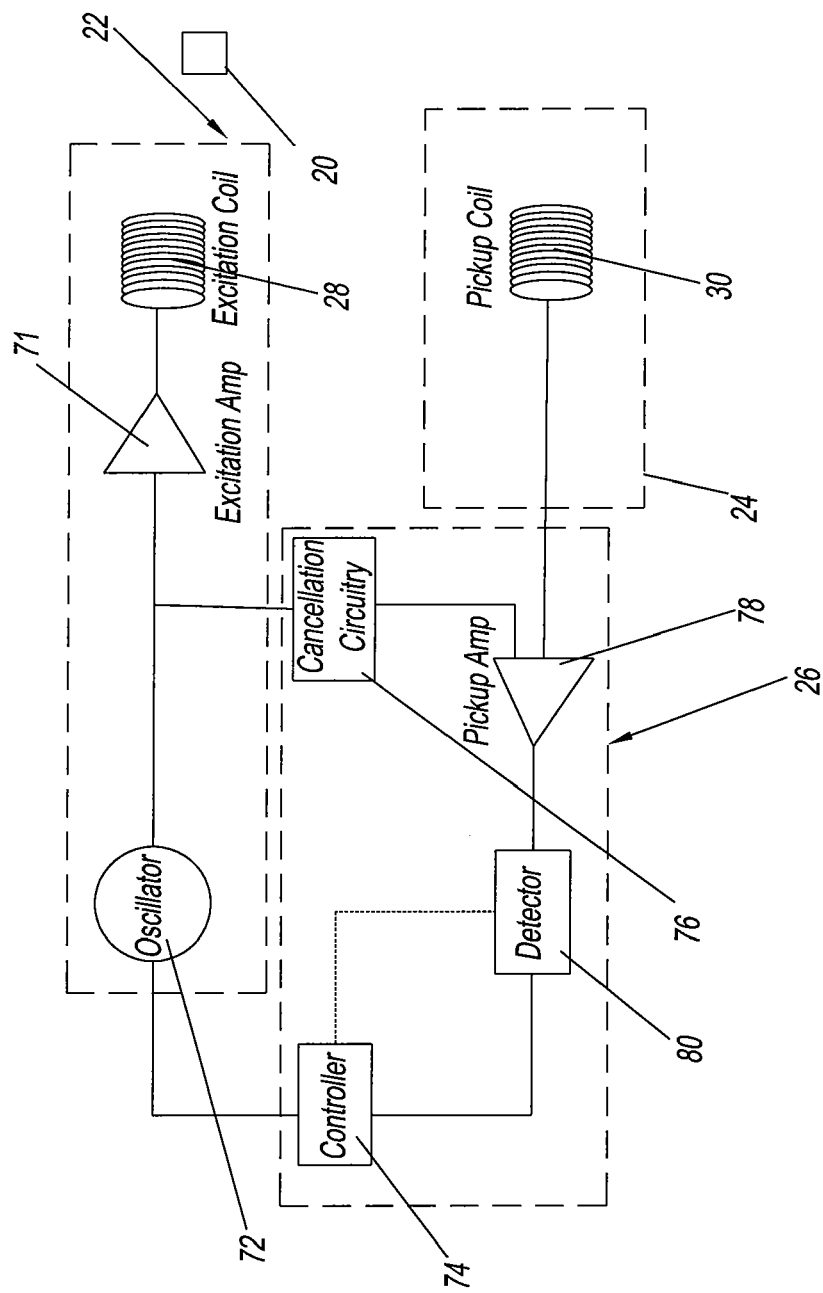
FIG. 11 is a circuit diagram of a data interpretation system of the present invention.
Figure 12:
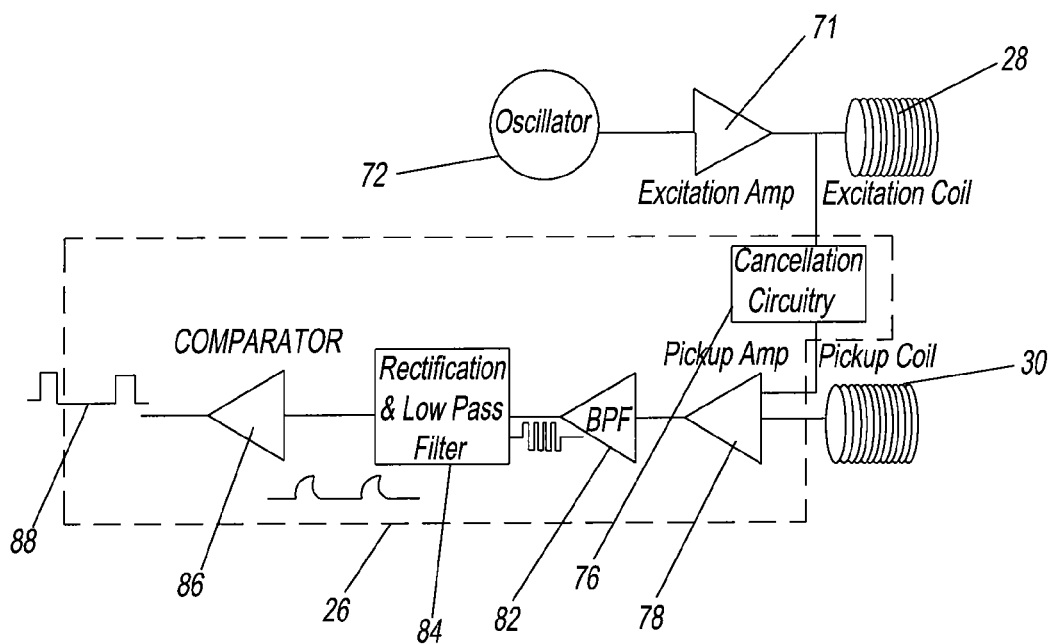
FIG. 12 is a second embodiment of a circuit diagram of a data interpretation system of the present invention.
Figure 13:
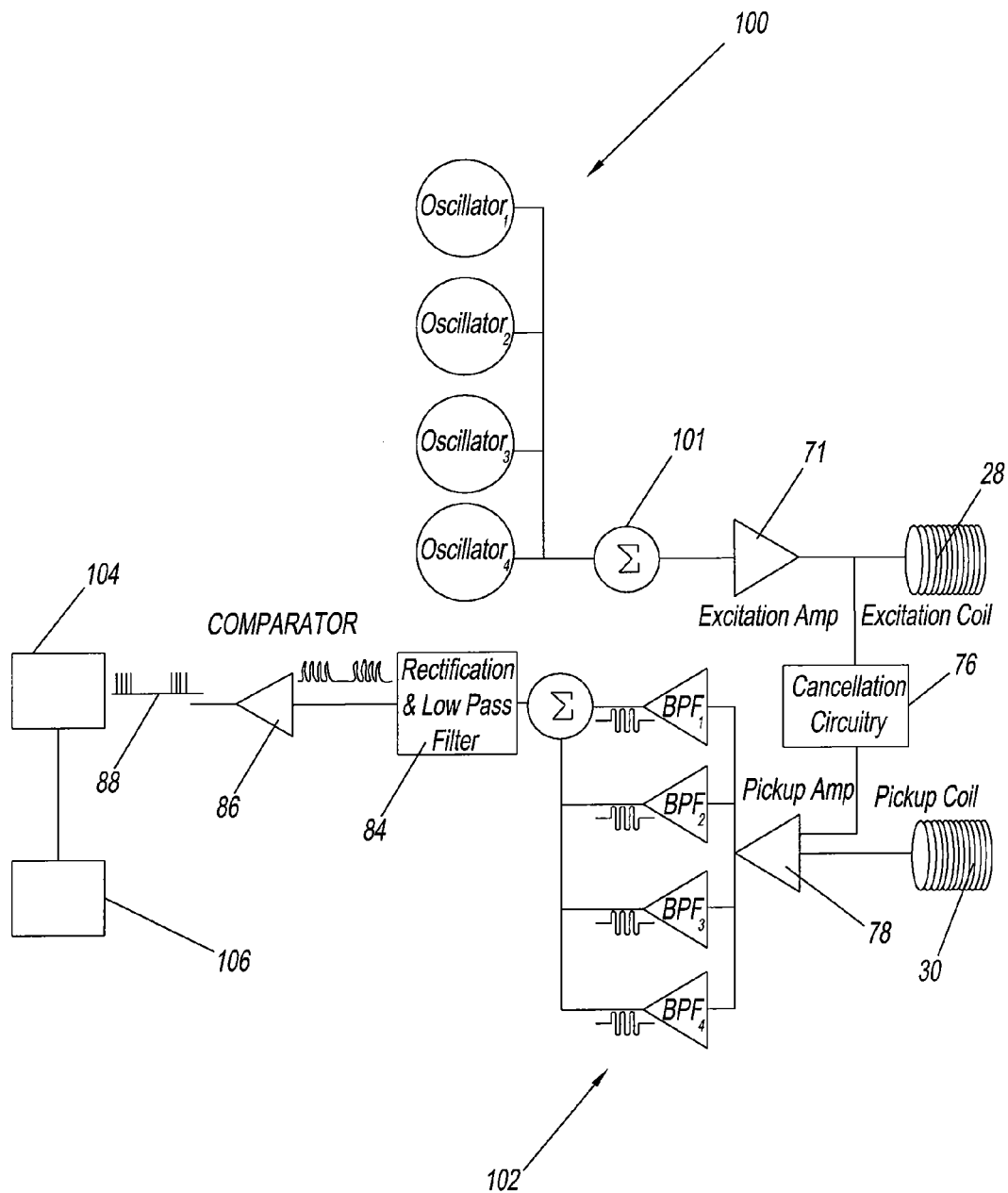
FIG. 13 is a third embodiment of a circuit diagram of a data interpretation system of the present invention.

The apparatus 10 preferably has a magneto-mechanical pressure sensor 20, an electromagnetic excitation system 22 to interrogate the magneto-mechanical pressure sensor, a receiver 24 that measures the magneto-mechanical pressure sensor's resonant characteristics, and a data interpretation system 26. The receiver 24 and the data interpretation system 26 are shown in FIGS. 11 through 13 and discussed later herein. The data interpretation system 26 preferably translates a resonant characteristic of the magneto-mechanical pressure sensor 20 and converts this resonant characteristic to a tire pressurization state. Then, data interpretation system 26 displays the tire pressurization state to a vehicle operator.

Most preferably, the apparatus 10 has the magneto-mechanical pressure sensor 20 that does not require any independent power source, and thus does not have any physical connection or wires entering or exiting from the tire 12 for providing any power that may complicate operation. The apparatus 10 is low in cost. Preferably, the apparatus 10 has one or more components that are fabricated as an integral unit to the tire 12. However, this is not necessary and the unit may be fabricated independently and later attached in some manner to the tire 12 or alternatively the tire rim.

Referring to FIG. 1, there is shown a number of magneto-mechanical pressure sensors 20. These pressure sensors 20 are positioned at one or more locations in the interior of the tire 12 preferably on an opposite side of the ground contacting covering portion 14. Alternatively, the number of magneto-mechanical pressure sensors 20 can be mounted to the wheel rim 16. Still alternatively, the number of magneto-mechanical pressure sensors 20 can be placed beneath a tread of the covering portion 14 of the tire 12 or alternatively in a portion of a valve stem assembly. However, one skilled in the art should appreciate that in all embodiments, the number of magneto-mechanical pressure sensors 20 most preferably are in relatively close proximity to the electromagnetic excitation system 22 to receive an electromagnetic field therefrom.

Preferably, the electromagnetic excitation system 22 has a number of coils, or more particularly an excitation coil 28 and a receiving coil 30 shown in FIG. 11. The electromagnetic excitation system 22 is preferably operatively connected to the receiver 24 and the data interpretation system 26.

As shown in FIG. 1, one skilled in the art should appreciate that the magneto-mechanical pressure sensor 20 could be mounted in a number of locations. For example, the magneto-mechanical pressure sensor could be mounted on a tire sidewall, inside the tire sidewall, on the wheel itself, or even molded as an integral feature of the tire wall, or any combinations thereof. Preferably, the magneto-mechanical pressure sensor 20 regardless of the location has a magnetostrictive element oriented in a direction complementary to a centrifugal force of the tire 12 so as not to impede the electromechanical resonance of the magnetostrictive element.

Two approaches, discrete and continuous, are disclosed for using a magneto-mechanical element with the magneto-mechanical pressure sensor 20 in the apparatus 10. In the continuous approach, the magneto-mechanical pressure sensor 20 preferably measures a resonance of the magnetostrictive element continuously as a function of pressure. In the discrete approach, the magnetostrictive element of the magneto-mechanical pressure sensor 20 are sensed in either an "on" or "off" state as a function of pressure, indicating certain predetermined pressure threshold values. In this embodiment, the pressurization state of the tire 12 is thus interpreted from a combination of on/off signals received by the receiver 24. It should be also noted that the "on" and "off" states may be implemented as "resonate" and "don't resonate". Alternatively, "on" state and "off" state may be implemented as "resonate at frequency A" and "resonate at frequency B".

In one embodiment, a continuous magneto-mechanical pressure sensor 20 is used. However, one skilled in the art should appreciate that the apparatus 10 may be used either with the continuous magneto-mechanical pressure sensor, a discrete magneto-mechanical pressure sensor or any combination thereof.

Figure 2:
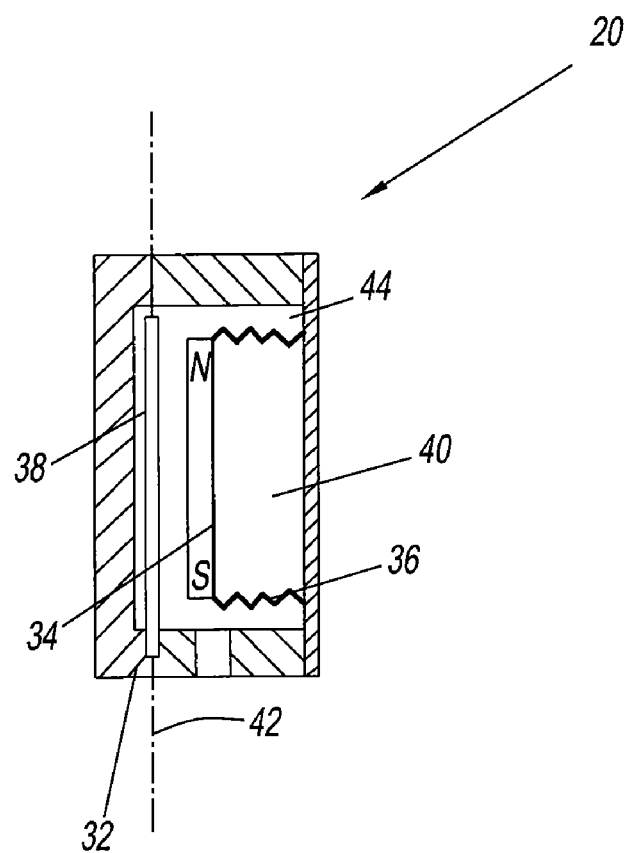
FIG. 2 is a sectional side view of an embodiment of the first magneto-mechanical pressure sensor of FIG. 1.

Referring to FIG. 2, there is shown a preferred embodiment of the magneto-mechanical pressure sensor 20 of the apparatus 10 of the present invention. Each magneto-mechanical pressure sensor 20 preferably has a housing 32. The housing 32 preferably has an interior space therein for protecting the components of the magneto-mechanical pressure sensor 20. Each magneto-mechanical pressure sensor 20 preferably has a magnetically hard element 34 connected to a member 36, and a magnetostrictive element 38 in spaced relation from the magnetically hard element in the tire 12. The magnetically hard element 34 is preferably a magnetic element of relatively higher coercivity. One skilled in the art should appreciate that the magnetostrictive element 38 may be any magnetostrictive material known in the art including but not limited to alloys of iron, cobalt, yttrium, gadolinium, terbium, dysprosium, or any combinations thereof.

Preferably, the magneto-mechanical pressure sensor 20, when undergoing a linear motion, changes a proximity between the magnetically hard element 34 and the magnetostrictive element 38. In doing so, the magneto-mechanical pressure sensor 20 causes a change in a non-alternating bias field strength experienced by the magnetostrictive element 38, and thus shifts the peak resonant frequency exhibited by the magnetostrictive element when interrogated with an alternating magnetic field from the electromagnetic excitation system 22.

Preferably, the magnetically hard element 34 or the magnetostrictive element 38 is mounted on a moving portion of the magneto-mechanical pressure sensor 20. The other element of the magnetically hard element or the magnetostrictive element is mounted in a stationary manner. The magneto-mechanical pressure sensor 20 preferably determines the tire pressurization state by referencing a known pressure. Thus, the magneto-mechanical pressure sensor 20 preferably has a reference pressure chamber 40. Alternatively, the reference pressure chamber 40 may use atmospheric pressure external to the tire 12 as the reference pressure.

Referring again to FIG. 2, a preferred feature of the present invention is that the magnetostrictive element 38 is not mechanically damped. In a preferred embodiment of the present invention, the magnetostrictive element 38 has a major axis 42 that is aligned radially relative to the tire 12. Preferably, the magnetostrictive element 38 has suitable dimensions and has a suitable shape to maintain centering the magnetostrictive element in interior of the tire 12. Alternatively, the magnetostrictive element 38 may be anchored. The anchoring preferably limits a mechanical dampening of the magnetostrictive element 38, upon rotation of the tire 12 during, for example, driving.

Alternatively, the magnetostrictive element 38 may have a central node (not shown). The magnetostrictive element 38 may be held in the tire 12 at the central node or alternatively at either end by a mounting device, such as a mounting pin or a thin jawed clamp. One skilled in the art should appreciate that the magnetostrictive element 38 may be mounted in any suitable manner known in the art to orient the device radially with respect to the tire's 12 rotation in order to keep a free end or ends of the magnetostrictive element from being deflected away from the magnetically hard element 34 due to the centrifugal force.

The member 36 of the magneto-mechanical pressure sensor 20 is a sealed bellows. In this example, the sealed bellows 36 is sealed with a reference pressure. A variation in the tire pressure is illustrated as reference numeral 44. The variation causes the magnetically hard element 34 to move with respect to the magnetostrictive element 38. The magnetostrictive element 38 is preferably held in the housing 32, however the magnetostrictive element is preferably free to resonate, but anchored with respect to an inner radius of the tire 12. In this manner, the magnetostrictive element 38 is stabilized against the centrifugal forces experienced in the tire 12 upon rotation.

Figure 3:
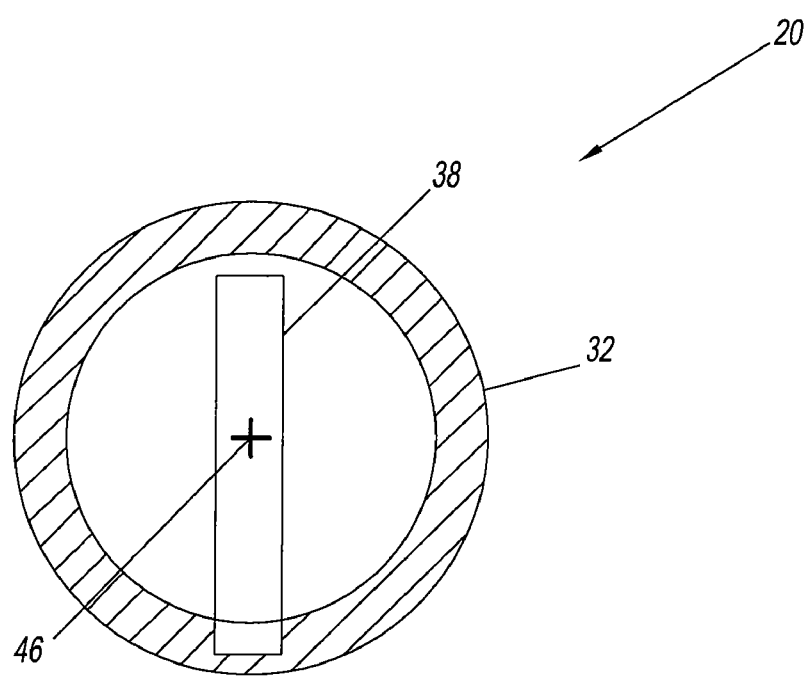
FIG. 3 is side sectional view of the first magneto-mechanical pressure sensor of FIG. 2 with a magnetostrictive element having a first end connected to a wall and a second free end.

Referring to FIG. 3, there is shown a preferred orientation and anchoring of the magnetostrictive element 38. Alternatively, the magnetostrictive element 38 may be anchored at a centermost portion as shown in a middle of the magnetostrictive element as reference numeral 46, at any other location on a horizontal line going through the middle, or have both ends free floating in the tire 12. However in the embodiment shown in FIG. 3, the magnetostrictive element 38 has one end connected in a cantilever fashion to the housing 32.

Figure 4:
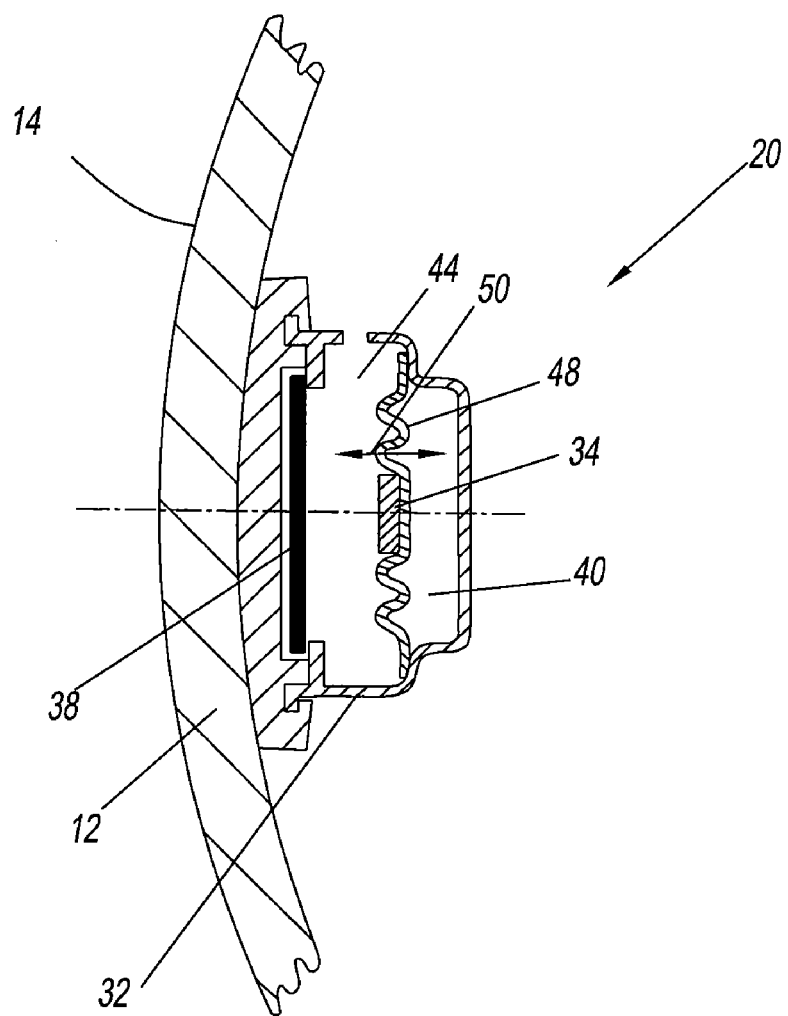
FIG. 4 is a side sectional view of a second embodiment of the first magneto-mechanical pressure sensor of FIG. 1.

Referring to FIG. 4, there is shown another or second preferred embodiment of the magneto-mechanical pressure sensor 20. Similar to the embodiment of the magneto-mechanical pressure sensor 20 of FIGS. 2 and 3, the magneto-mechanical pressure sensor has magnetostrictive element 38 and magnetically hard element 34. Preferably, the member 36 of the magneto-mechanical pressure sensor 20 of this embodiment is a diaphragm 48. The diaphragm 48 preferably is a thin disk that is deflected in a manner that is proportional to the pressure difference between the two sides of the diaphragm. Preferably, the diaphragm 48 is connected to an interior wall of the housing 32 and acts as the reference pressure chamber 40. In this embodiment, the diaphragm 48 moves in a manner as indicated by reference arrows 50.

The magneto-mechanical pressure sensor 20 also has the magnetically hard element 34 that is closely adjacent to the diaphragm 48 and is spaced a predetermined distance away from the magnetostrictive element 38. The housing 32 preferably has an opening that allows a first side of the diaphragm 48 to be exposed to air in the tire 12, while the opposite or second side of the diaphragm is exposed to the reference pressure chamber 40.

Figure 5:
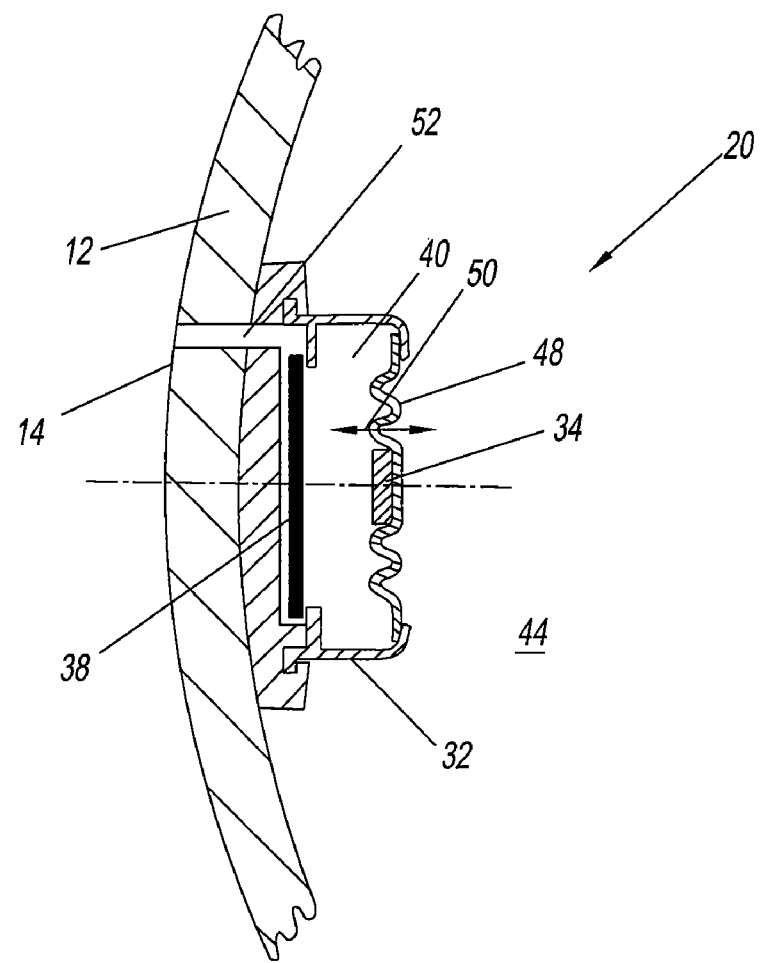
FIG. 5 is a side sectional view of a third embodiment of the magneto-mechanical pressure sensor of FIG. 1.

Referring to FIG. 5, there is shown another or third preferred embodiment of the magneto-mechanical pressure sensor 20 of the present invention. In this embodiment, the magneto-mechanical pressure sensor 20 preferably has the diaphragm 48 with a channel 52. The channel 52 preferably is through the covering portion 14 of the tire 12 and communicates with ambient pressure outside of the tire. Thus, the channel 52 provides the diaphragm 48 with the reference pressure chamber 40 while the location on an opposite side of the diaphragm 48 communicates with the tire pressure 44.

Figure 6:
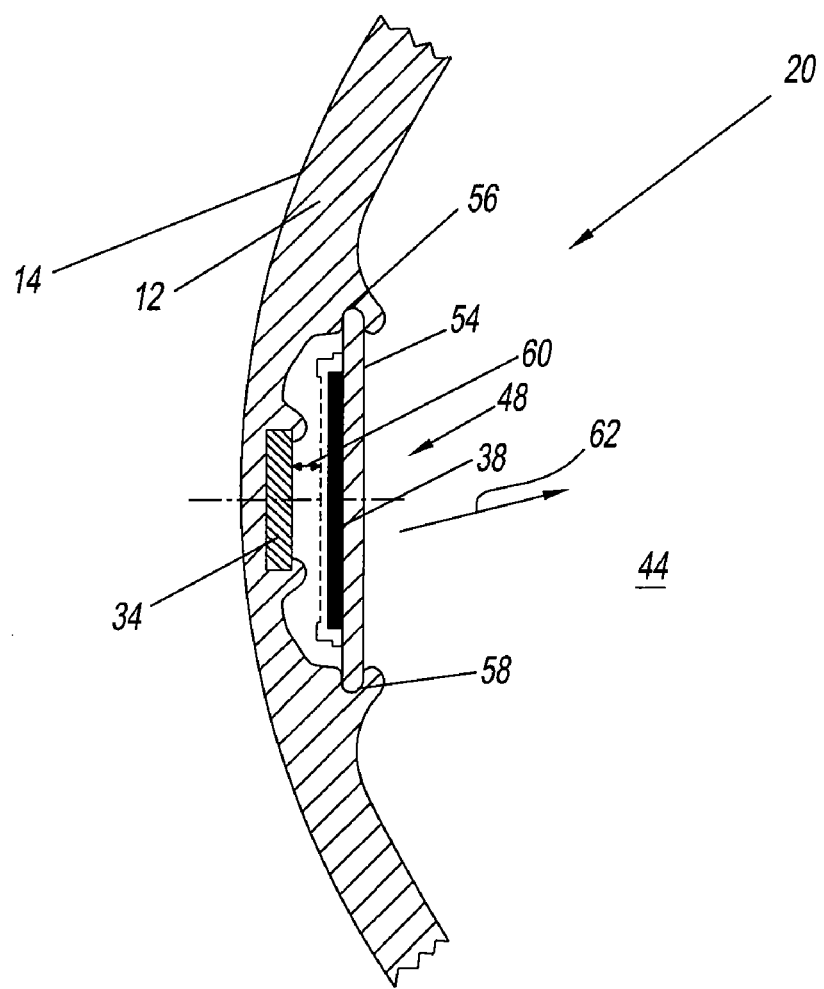
FIG. 6 is a side sectional view of a fourth embodiment of the magneto-mechanical pressure sensor of FIG. 1, but being formed in a sidewall of the tire.

Referring to FIG. 6, there is shown still another or fourth preferred embodiment of the magneto-mechanical pressure sensor 20 of the present invention. In this preferred embodiment, the magneto-mechanical pressure sensor 20 is formed in the tire 12 on an opposite side of the ground-contacting portion of the covering portion 14 of the tire. The magneto-mechanical pressure sensor 20 has the magnetically hard element 34 in the tire 12, preferably in the side wall of the tire. Preferably, an indentation in the side wall is formed by removing a portion of the tire 12 and the magnetically hard element 34 is in the complementary sized indentation. Alternatively, the sensor 20 could be an integral addition to the inside sidewall to preserve the mechanical integrity of the tire 12. The magneto-mechanical pressure sensor 20 preferably has a frame 54. The frame 54 is a support structure that is connected to one or more notches 56, 58 in the side wall of the tire 12.

The magneto-mechanical pressure sensor 20 preferably has the diaphragm 48 formed as or in the side wall of the tire 12. In this embodiment, the diaphragm 48 has a predetermined flexing property. The magnetostrictive element 38 is preferably connected to the frame 54. The magnetostrictive element 38 is mounted to the frame 54 by one or more mechanical fasteners that preferably will not substantially affect a resonance frequency of the magneto-mechanical pressure sensor 20. Preferably, the frame 54 is held substantially stationary relative to a rim of the diaphragm 48 by the notches 56, 58.

Preferably, the frame 13 has sufficient rigidity to maintain stability and a mechanical performance of the tire 12. Also, the sufficient rigidity of the frame 13 prevents or virtually prevents any holes from forming through the covering portion 14 of the tire 12.

In this manner, any variation in the tire pressure 44 will change a distance 60 between the magnetically hard element 34 and the magnetostrictive element 38. This change in distance 60 will thus vary a non alternating magnetic bias on the magnetostrictive element 38 as a function of pressure that will be detected by the interrogation of the electromagnetic excitation system 22 as indicated by reference arrow 62.

In another embodiment of the present invention, the magneto-mechanical pressure sensor 20 may have the magnetostrictive element 38 moving in a rotary manner similar to a needle on a pressure gauge (not shown). The rotary motion magneto-mechanical pressure sensor, such as a Bourdon tube type pressure gauge, may rotate a non-alternating biasing magnet relative to the magnetostrictive element 38 shown in FIG. 6. The rotary motion is designed such that the magnetically hard element 34 and the magnetostrictive element 38 are preferably aligned relative to one another at either a highest tire pressure or a lowest tire pressure of the tire 12. As the pressure changes, a degree of alignment of the non-alternating biasing magnetic field changes relative to the major axis 42 of the magnetostrictive element 38, thus causing a shift in the resonant peak of the magnetically hard element 34 and the magnetostrictive element combination.

In another embodiment of the magneto-mechanical pressure sensor 20, the apparatus 10 has a number of magnetostrictive elements 38 and magnetically hard elements 34, or an array of sensors 20. Each combination resonates at discernibly different predetermined frequencies for detection by the receiver 24.

Figure 7:
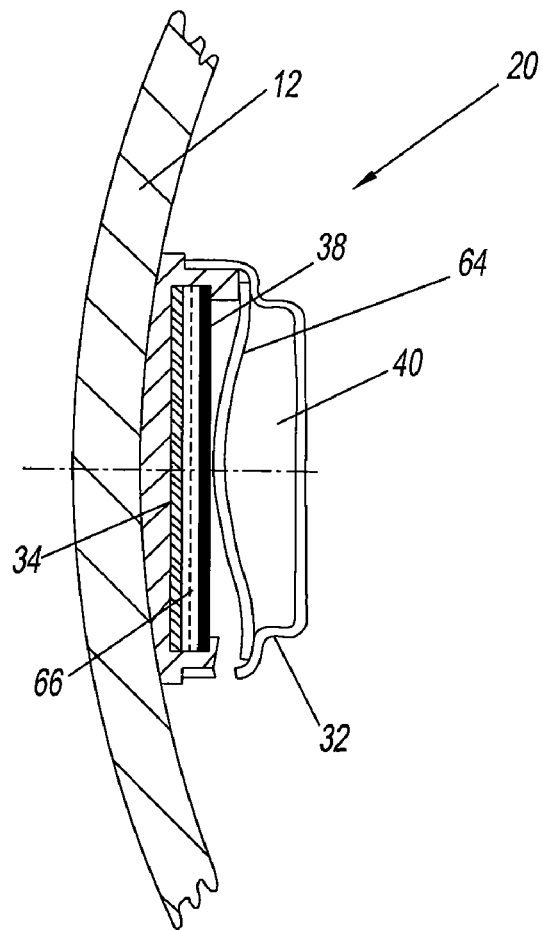
FIG. 7 is side sectional view of a fifth embodiment of the magneto-mechanical pressure sensor of FIG. 1.

In still another or fifth preferred embodiment of the present invention, which is shown in FIG. 7, the magneto-mechanical pressure sensor 20 has a bi-stable, snap-acting disc 64. The bi-stable, snap-acting disc 64 preferably toggles under a predetermined pressure differential in the pressure chamber 40. Preferably, the bi-stable, snap-acting disc 64 toggles from a first position to a second position. In the first position, the magneto-mechanical pressure sensor 20 allows the magnetostrictive element 38 to electro-magnetically resonate. In the second position, the bi-stable, snap-acting disc 64 prevents and impedes the magnetostrictive element from resonating electro-magnetically. When the predetermined threshold pressure differential is exceeded, the bi-stable, snap-acting disc 64 preferably toggles to the second position. Here, the stable, snap-acting disc 64 contacts the magnetostrictive element 38, thus mechanically damping the electromagnetic resonance, placing the magneto-mechanical sensor 20 in an "off" state.

Referring to FIG. 7, the magneto-mechanical pressure sensor 20 has a membrane 66. The membrane 66 is preferably a support structure placed between the magnetically hard element 34 and the magnetostrictive element 38. The membrane 66 prevents the magnetostrictive element 38 from contacting and being adhered to the magnetically hard element 34, and thus prevents further operation of the magneto-mechanical pressure sensor 20. The membrane 66 allows the magnetostrictive element 38 to reset because the bi-stable, snap-acting disc 64 moves from the second position to the first position, for example, during inflation of the tire 12.

One skilled in the art will appreciate that the apparatus 10 may have an array of magneto-mechanical pressure sensors 20. Each sensor 20 has the bi-stable, snap-acting disc 64 with different predetermined toggle pressure thresholds and different resonant frequencies. The array is read by determining which frequency elements have been damped. Alternatively, each magneto-mechanical pressure sensor 20 may resonate at the same frequency, even when located at a number of different angular positions along the tire 12. The predetermined toggle threshold pressures of the bi-stable, snap-acting disc 64 is designed to be different at each position. In this embodiment, determination of the pressure inside the tire 12 can be accomplished by counting the number of pressure sensors 20 still resonating. The magneto-mechanical pressure sensors 20, each with the bi-stable, snap-acting disc 64, can be an integral feature of the tire 12, for example in the sidewall of the tire.

In another embodiment of the present invention, the bi-stable, snap-acting disc 64 preferably may traverse from a first loading position upon an application of a first loading force and may traverse from the first loading position to a second unloading position upon an application of a second unloading force. The second unloading force may be different from the first unloading force or less than the first unloading force between the inflation and deflation of the tire 12. A sensitivity of the apparatus 10 preferably depends from the bi-stable, snap-acting disc 64 being set at a normal inflation pressure, and that the bi-stable, snap-acting disc toggling reliably in an under-inflated situation of the tire 12.

Figure 8:
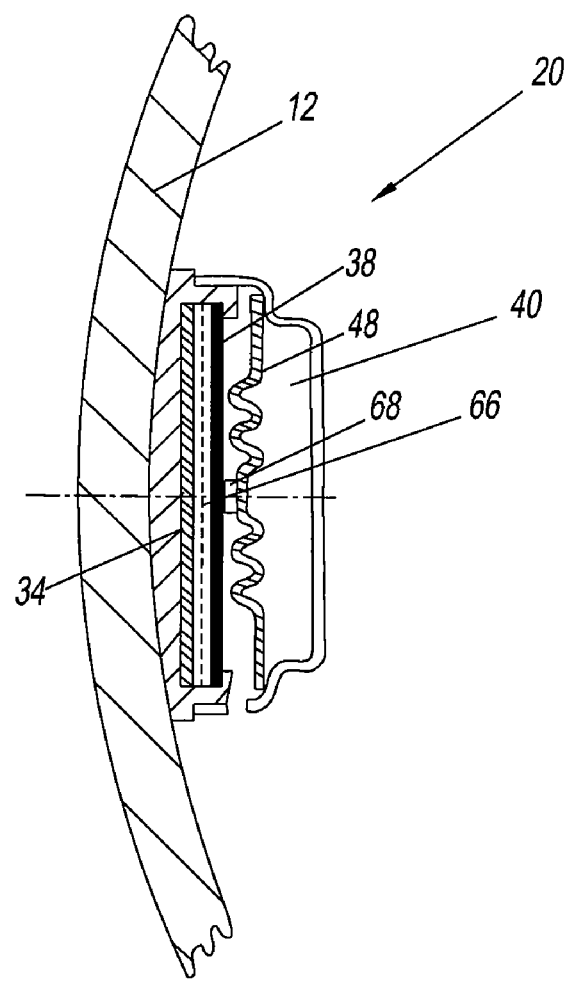
FIG. 8 is a side sectional view of a sixth embodiment of the magneto-mechanical pressure sensor of FIG. 1.

Referring to FIG. 8, in another or sixth preferred embodiment of the present invention, the magneto-mechanical pressure sensor 20 may have a discrete sensing device 68. The discrete sensing device 68 preferably contacts and dampens the magnetostrictive element 36 at a predetermined pressure. The discrete sensing device 68 preferably dampens or changes a resonance characteristic of the magnetostrictive element 36. The discrete sensing device 38 is preferably any device that touches the magnetostrictive element 36 and changes magnetostrictive element 36 to an "on" or an "off" state.

Figure 9:
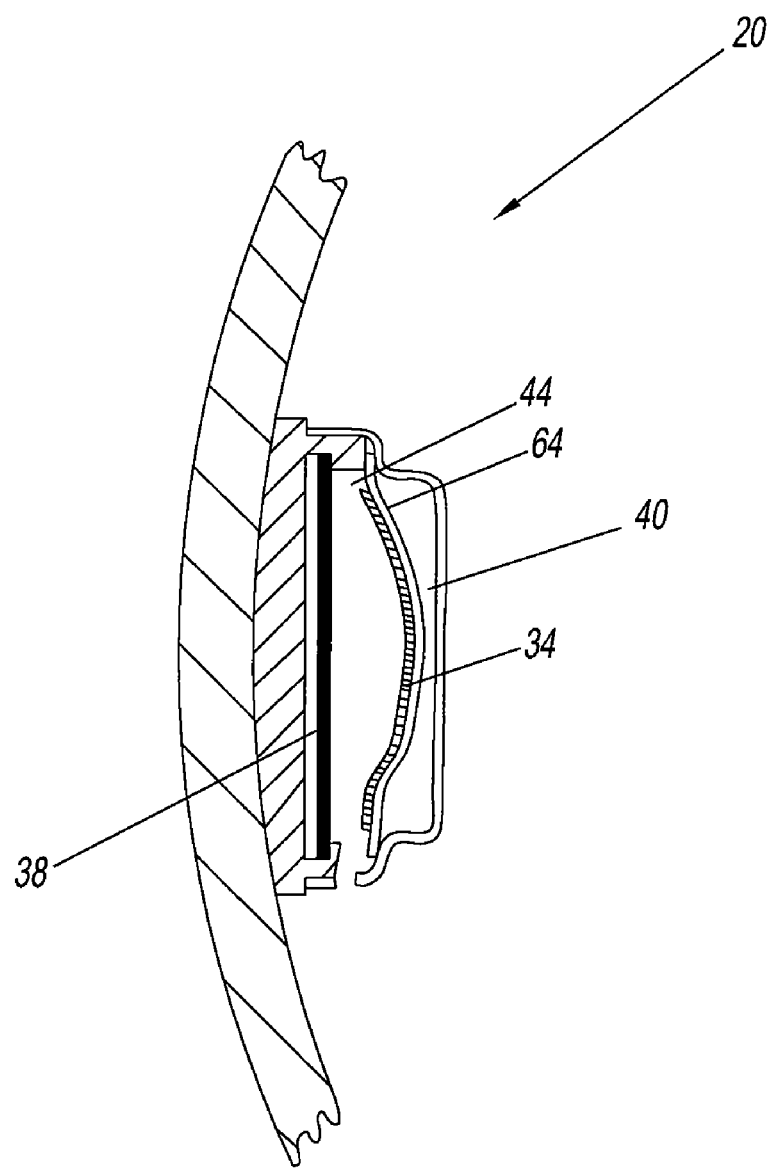
FIG. 9 is a side sectional view of a seventh embodiment of the magneto-mechanical pressure sensor of FIG. 1.

Referring to FIG. 9, in still another or seventh preferred embodiment of the present invention, the magneto-mechanical pressure sensor 20 may have the bi-stable, snap-acting disc 64 alternatively configured in a way that does not effect damping of the magnetostrictive element 38. In this preferred embodiment, the hard magnetic element 34 is connected to a lateral side of the bi-stable, snap-acting disc 64. The bi-stable, snap-acting disc 64 connected to the hard magnetic element 34 preferably toggles from the first position to the second position to indicate first and second tire pressurization states. To toggle from the first position to the second position, different resonant frequencies would be sensed thereby indicating the "on" or the "off" state. Alternatively, the bi-stable, snap-acting disc 64 may be fabricated entirely from a magnetically hard material 34.

Preferably, the data interpretation system 26 calculates pressure from the resonant frequency. The frequency is input into a transfer function that interprets the input as the pressure. One property of the magnetostrictive element 38 is that the frequency response is dependent on a temperature of the air in the tire. A temperature correction is necessary for the accurate interpretation of pressure in the magneto-mechanical pressure sensor 20. A change position, velocity, and acceleration also affect a determination of resonant frequency of the magneto-mechanical pressure sensor 20 in the tire 12.

Compensation for these, as well as temperature effects, is needed to calculate pressure from the measured resonant frequency.

Figure 10:
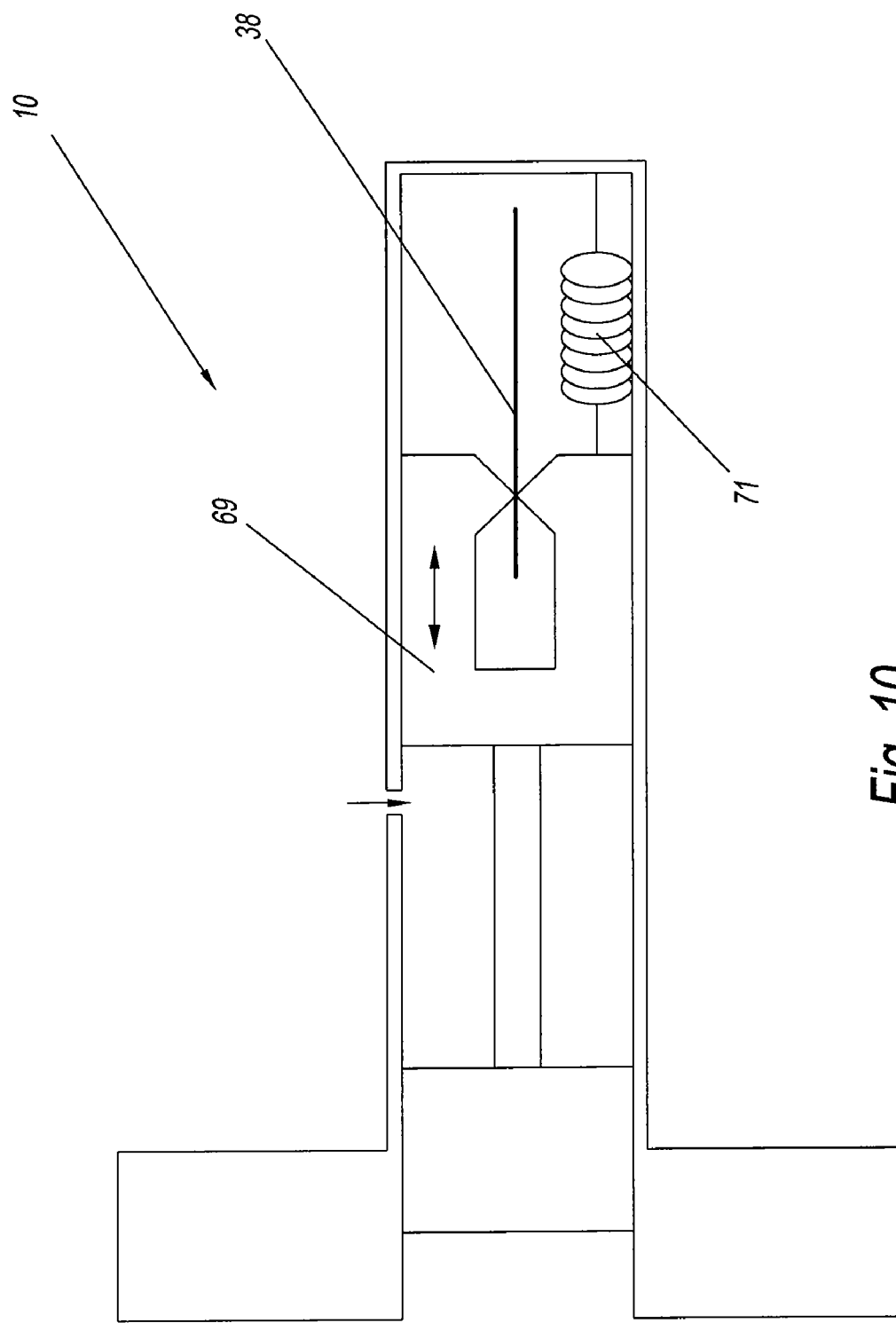
FIG. 10 is a side sectional view of an eighth embodiment of the first magneto-mechanical pressure sensor of FIG. 1 having a clamp to adjust a length of a magnetostrictive element.

Referring to FIG. 10, in another embodiment of the present invention, the magnetostrictive element 38 preferably has an initial length and a first resonance frequency. The magneto-mechanical pressure sensor 28 may further have a member 69 that reduces or increases the initial length of the magnetostrictive element 38. This reduction or increase in the length will modulate the first resonance frequency for later detection. Preferably, the member 69 is a clamp having a space therebetween for holding the magnetostrictive element 38 therein. The clamp 69 is preferably connected to a piston that communicates with a reference pressure at a first location and a tire pressure at a second location through an aperture. This change in pressure adjusts the length and thus the resonance frequency for later detection. A spring 71 is also provided in the magneto-mechanical pressure sensor 20 on a opposite side of the piston to effect a return when the length of the magnetostrictive element 38 based upon a pressure change in the tire 12 is reduced or increased.

In an eighth embodiment of the magneto-mechanical pressure sensor 20 the magneto-mechanical pressure sensor has a device for modulating the vibration of the magnetostrictive element 38. Preferably, the magneto-mechanical pressure sensor 20 has a pointed clamp or clamping mechanism 70. The pointed clamp mechanism 70 is connected to a location of the magnetostrictive element 38. Preferably, the pointed clamp mechanism 70 is connected to a substantially middle location of the magnetostrictive element 38. The pointed clamp mechanism 70 may be manipulated to move on the magnetostrictive element 38 to change a clamp point on the magnetostrictive element as a function of pressure. In this manner, the pointed clamp mechanism 70 preferably modulates the vibration of the magnetostrictive element 38 and thus changes the resonant frequency detected.

Referring to FIG. 11, there is shown a block diagram for the electromagnetic excitation system 22 for a continuous type magneto-mechanical pressure sensor 20 having the excitation coil 28, the receiving coil 30, a excitation oscillator 72 and receiving circuitry for the continuous monitoring of the tire pressure. The same circuitry preferably also monitors the resonant frequency responses of a temperature sensor (not shown). Alternatively, the excitation coil 28 and the receiving coil 30 may be reduced to functions of one coil. In this alternative embodiment, the coil may alternate in a time division multiplexed manner between an excitation function and a receiving function. The apparatus 10 has a data interpretation system 26. The data interpretation system 26 has the controller 74. The controller 74 is preferably a microprocessor or a digital signal processor that controls the excitation oscillator 72 that is connected to an excitation amplifier 71, to detect peak responses, and to convert the peak responses from resonant frequency to the temperature and the tire pressure. The controller 74 preferably sets the frequency that the excitation oscillator 72 outputs.

A signal from the excitation oscillator 72 is current amplified and output to the excitation coil 28. The output is exposed to the magneto-mechanical sensor 20. The pickup coil 30, which preferably is in a coaxial manner with the excitation coil 28, receives a first signal directly from the excitation coil, and a second signal from the magneto-mechanical sensor 20.

The data interpretation system 26 has a cancellation circuit 76. The cancellation circuit 76 has a canceling coil therein (not shown). The canceling coil (not shown) preferably is wrapped in an opposite direction relative to pickup coil 30, or alternatively is a phase shifted differencing amplifier. The resultant output from a pickup amplifier 78 (that is connected to the pickup coil 30 and the cancellation circuitry 76) is substantially solely from the magneto-mechanical sensor 20.

The data interpretation system 26 has a detector 80. The detector 80 may be any circuitry known in the art that allows the controller 74 to measure peak amplitude of the output of the pickup amplifier 78. The detector 80 may alternatively be a filtered rectifier, a peak detecting sample, a hold circuit, an analog to digital converter run by the controller 74 or any other type of amplitude demodulating circuitry. In another less preferred embodiment, the controller 74 may control the detector 80 in more digitally controlled embodiments.

Referring to FIG. 12, there is shown another or second embodiment of the data interpretation system 26 for a discrete type sensor 20 of the present invention. The oscillator 72 implements a single excitation frequency. The oscillator's output is a current that is amplified by the excitation amplifier 71 to drive the excitation coil 28 and emit the electromagnetic field in the tire 12. In this embodiment, the pickup coil 30 is preferably a sensor receiver coil that picks up the magnetic field due to both the excitation coil 28 and the magneto-mechanical pressure sensor 20 in the tire 12. The data interpretation system 26 has the cancellation circuit 76 that is connected between the pickup amplifier 78 and the excitation coil 28. The cancellation circuit 76 removes any artifact of the excitation coil 28. The cancellation circuit 76, as in the embodiment of FIG. 12, may be a canceling coil (not shown) wrapped in the opposite direction from that of the pickup coil 30, a differencing amplifier, or alternatively any other suitable device known in the art.

An alternating current output of the pickup amplifier 78 is run through a band pass filter 82 preferably centered at an expected ideal resonant frequency. This alternating current output outputs a band pass filtered signal. The band pass filtered signal is made unipolar by a rectifier collectively shown with the low pass filter as reference numeral 84. The rectifier 84 is preferably a full or a half wave rectifier. The data interpretation system 26 has a low pass filter that is connected to the rectifier 84. The low pass filter and rectifier 84 preferably provides a rectified signal that is smoothed by the low pass filter. The data interpretation system 26 has a comparator 86, preferably a threshold comparator, connected to the low pass filter and the rectifier 84. The smoothed rectified signal is then squared by the comparator 86. Accordingly, an output 88 of the magneto-mechanical sensor 20 is seen as a square wave pulse for each rotation of the tire 12.

Referring to FIG. 13, the data interpretation system 26 may be altered to serve a number of magneto-mechanical sensors 20. The number of magneto-mechanical sensors 20 are preferably excited and detected as discussed. In this embodiment, the data interpretation system 26 has a complementary number of oscillators 100 preferably equal or almost equal to the number of magneto-mechanical pressure sensors 20 with each of the number of magneto-mechanical pressure sensors being centered on a different ideal resonant frequency.

The exciting frequencies are summed (or time division multiplexed) and amplified by the excitation amplifier 71. One skilled in the art should appreciate that the signal synthesis and summation or multiplexing can readily be implemented by a second controller 101.

The excitation coil 28 is preferably connected to the cancellation circuit 76 and the output of the cancellation circuit is input into the pick up amplifier 78. The output of the pickup coil 30 from the number of magneto-mechanical pressure sensors 20 are connected to the pickup amplifier 78. The data interpretation system 26 has a number of band pass filters 102 equal to the number of magneto-mechanical pressure sensors 20. Each band pass filter 102 is preferably tuned and centered on a different predetermined ideal resonant frequency. One skilled in the art should appreciate the cancellation circuit 76 and the band pass filters 102 are wired in parallel relative to one another, and can also be alternatively implemented digitally. It can also be appreciated by those skilled in the art that an analog or digital single band pass filter with one or more corner frequencies may be controlled by the controller 74. The outputs of the magneto-mechanical pressure sensors 20 are relayed to the pickup coil 30, amplified then pass through the band pass filters 102 and are summed. The summed output is then rectified by the rectifier 84 and then smoothed by a low pass filter, and then squared by the comparator 86.

Assuming each individual component magneto-mechanical discrete type pressure sensor 20 in, on or part of the tire 12 is rotationally offset on the tire, the output is a series of pulses for each tire. The number of pulses in each series is indicative of how many pressure thresholds have been exceeded (or not reached, depending on mechanical configuration). One skilled in the art should appreciate that detection of the magneto-mechanical pressure sensor 20 being in, on or part of the tire 12 could also be implemented by a peak detection technique, a phased-lock loop technique, a synchronized sampling technique, or any combinations thereof.

The pulse trains that are emitted or outputted by the apparatus 10 of each tire 12 are transmitted to a central circuit 104 that interprets the pulse trains. The central circuit 104 could be implemented by the controller 74, preferably a microprocessor which times and counts the pulses, to determine how many magneto-mechanical pressure sensors 20 are above a predetermined threshold for a given tire 12. The central circuit 104 then activates an indicator 106 or a display, on for example a dashboard, to alert the vehicle operator as to the tire pressurization state of each tire 12. One skilled in the art should appreciate that the display 106 may be an analog display, a digital display, an indicator, a light emitting diode, an audible alarm or any other device for communicating data to the vehicle operator or another entity.

The data interpretation system 26 preferably uses a first method or sequence that preferably finds a temperature first, then based upon the temperature adjusts the pressure frequency estimate before searching for the pressure sensor peak. The first method has a first step of estimating resonant frequency of temperature channel that is equal to a last know resonance frequency. Thereafter, the method has a second step of searching for a resonance peak, then a third step of looking up temperature for a corrected resonance frequency. The method has a fourth step of estimating pressure that is equal to a last known pressure, and the fifth step of looking up expected resonant frequency for estimated pressure. The method further has a sixth step of correcting expected resonant frequency for a second temperature measurement and the seventh step of searching for a resonant peak. The method still further has an eighth step of looking up a temperature for a corrected resonant frequency and then outputting this value to repeat the method from the first step.

The data interpretation system 26 preferably uses a second method or sequence that preferably determines a resonance frequency of a temperature sensor or the magneto-mechanical pressure sensor 20 in a rotating environment of the tire 12. The second method preferably has the first step a finding a resonance peak, then a second step of setting frequency A for a new predetermined estimate. The second method preferably has the third step of waiting for a detectable response, a fourth step of saving time of response, a fifth step of monitoring the response and recording a maximum amplitude. The second method also has a sixth step of calculating a time interval since the last response. The second method further has a seventh decision step of does the rotational velocity require a ring up correction, and if so, then the second method has the step of looking up the ring up correction for a rotational velocity and apply a correction to the output.

If the seventh decision step does not require a ring up correction, then the method has the next eighth decision step. The eighth decision step has the step of does the velocity require a centrifugal force correction, and if so the second method has the ninth step of looking up a ring up correction for a rotational velocity and then a tenth step of applying a correction to a maximum amplitude measured by this frequency. If the eighth decision step does not require the correction, the eleventh step is to add the corrected sample to an average. The second method further has the twelfth step of repeating for a number of measurements to create the average, then the thirteenth step of repeating for frequency A−, and A+. The second method further has the fourteenth decision step of whether the response to Frequency A is left of the peak or right of the peak. If, left of the peak, the frequency A is re-estimated higher, if right of the peak the frequency A is re-estimated lower. The second method further has the fourteenth decision step that if the output is substantially at the peak, then the second method is completed. This method determines the resonant frequency first of the magneto-mechanical pressure sensor 20 in the rotating environment of the tire 12.

The disclosed method or algorithm reduces the number of measurements required for determining the resonant frequency is disclosed herein. The method preferably uses three features. First, the method uses a memory to suggest as a first estimate of resonant frequency (pressure), the last successfully measured resonant frequency. The second feature of the method is that the method takes advantage of the characteristic shape of the resonance curve to converge on the peak in fewer than 30 frequency guesses. These two features apply to both the temperature and pressure measurements. The third feature of this algorithm is that once temperature is determined, it compensates the search frequency for the pressure peak by the amount expected from the temperature measurement.

Figure 14:
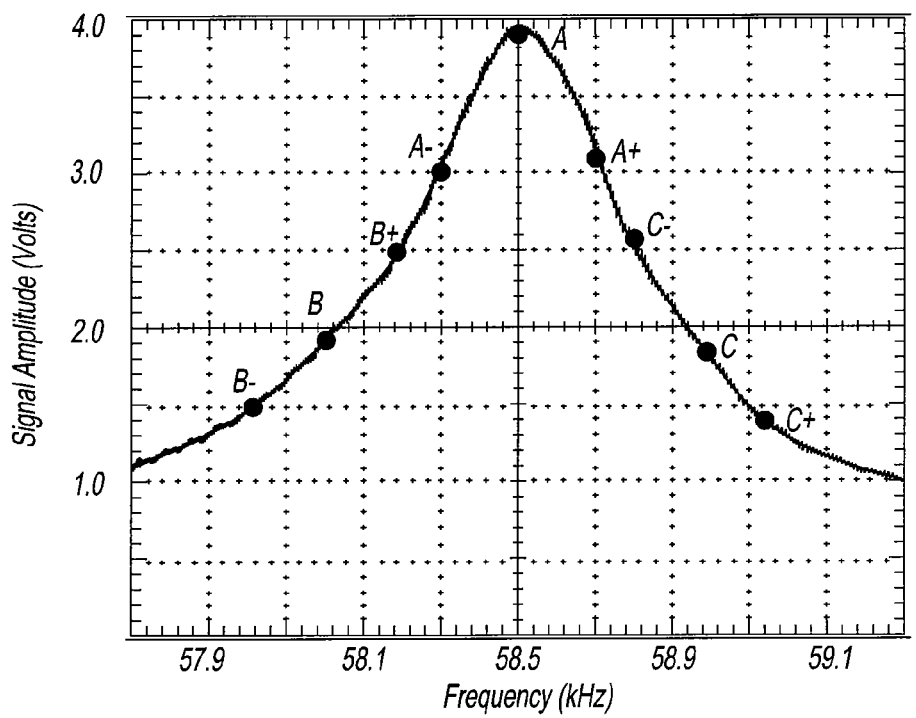
FIG. 14 is a graph showing a response amplitude of the magneto-mechanical pressure sensor of present invention.

The initial estimate for resonant frequency is set to the last known resonant frequency. The response amplitude is measured. An offset to the estimated resonant frequency is added to and subtracted from the initial guess frequency. Referring to FIG. 14, there is shown a graph with "+" and "−" estimates. For example, if a peak had not shifted since the prior measurement, estimate A would still be at the peak and the neighboring frequency estimates would be A− and A+. Response amplitudes for the neighboring frequency estimates are also measured and temporally filtered. The relative amplitudes of the center and neighboring frequencies determine the position of the frequency triad on the resonance curve. An initial estimate that is still at the peak of the curve is detected when $f(A-)<f(A)>f(A+)$, where $f(A)$, $f(A-)$ and $f(A+)$ are the response amplitudes at the three frequencies. In a similar way, $f(B-)<f(B)<f(B+)$, is indicative of the condition that the initial estimate was on the positive slope side of the resonance curve, and $f(C-)>f(C)>f(C+)$ is indicative of the fact that the initial estimate was on the negative slope side of the resonance curve. Knowledge of relative position on the resonance curve is used to form the next estimated peak frequency. Successive iterations store all measurements of previous iterations for the measurement, and shift the frequency estimate intelligently so as not to repeat measurements made on previous iterations.

One skilled in the art should appreciate that simply knowing which way to move the peak frequency estimate can, reduce the number of measurements. In the usual situation in which temperature and pressure do not change since the last measurement, the peak frequency will be determined in one iteration of three measurements for about a ten fold improvement over a full successive frequency scan for a resolution of 30 frequency/pressure points.

In still another embodiment of the present invention, numerical solutions or optimization of nonlinear equations approximating the resonance curve function can be used to converge on the peak in a greatly reduced number of measurements. Using assumptions similar to those above for a successive interrogation frequency method, a single guess determination can be made in three frequencies×twenty five samples (to filter for a five-fold improvement of signal to noise ratio) or seventy five measurements. In one aspect in which pressure is not changing, a single predetermined guess will be accurate. Response times for the single predetermined guess measurements are about one-tenth those required in which all thirty pressures are measured. In contrast to the example cited above, at twenty miles per hour, pressure can be determined in fifteen seconds versus one hundred fifty seconds and at sixth miles per hour, pressure can be determined in five seconds versus fifty seconds.

Other embodiments of this method are possible in which a value of the slope is used to adjust the center frequency used for the next iteration estimate. It is evident from the shape of the resonance curve that the slope of the curve increases as the peak is approached. As discussed above, the sign of the slope will determine whether the next frequency guess should be higher or lower. A larger magnitude slope will suggest that the peak is near, and that the next frequency guess should be relatively closer.

Continuous methods for determining pressure from magnetomechanical sensors 20 in a tire pressure application are sensitive to a number of factors. Some factors include a strength of the magnetically hard material, a distance between the magnetically hard material and the magnetostrictive material, a temperature of the magnetostrictive material, loading of any mass on the surface of the magnetostrictive element. Still other factors are an ambient magnetic properties of the wheel, tire, or vehicle, a speed of the tire, in as much as it affects the centrifugal force on the magneto-mechanical pressure sensor, and therefore could affect the geometry of the sensor, thus affecting the resonant frequency of the magnetostrictive material. Other factors include shock, vibration, mechanical deformation and electrical noise.

The advantage of the continuous type sensor is that it will produce a signal related to all pressurization states in a continuous analog manner. Preferably, the present invention discloses a discrete sensor that overcomes these deficiencies in the art. In one preferred embodiment, the apparatus 10 preferably indicates whether the pressure is above or below a threshold value. In that context, discrete sensor designs described above differentiate between two pressurization states. Those discrete sensors might a) toggle between two resonant frequencies, or b) toggle between resonating and non-resonating states by application of a damping force to the magnetostrictive material. The concept can be extended to a plurality of discrete sensors yielding a multi-step capability. It is easily seen that by having a number of magneto-mechanical pressure sensors 20 each sensing whether the pressure is above or below its assigned threshold yields a sensing system that senses pressure to a resolution or sensitivity equal to the number of different discrete sensors used.

The electromagnetic excitation system 22 and receiver 24, and the data interpretation system 26 preferably for single or multi-step systems is preferred over the continuous sensor design for its simplicity and reliability, primarily because fewer correction factors need to be applied. This method does not search for the resonant frequency peak as described above. Instead, the method recognizes oscillations from the magnetostrictive element at an expected resonant frequency range regardless of whether the peak resonant frequency has been shifted by the factors detailed above. The apparatus preferably detects a single resonating state of a magnetostrictive element, which responds to a single specified exciting frequency. Since this method intentionally operates on the shoulders of the resonant frequency curve, and not just at the peak, the design must assure that the response amplitude needs to be detectable over the expected range of resonant frequency peak shifts.

Figure 15:
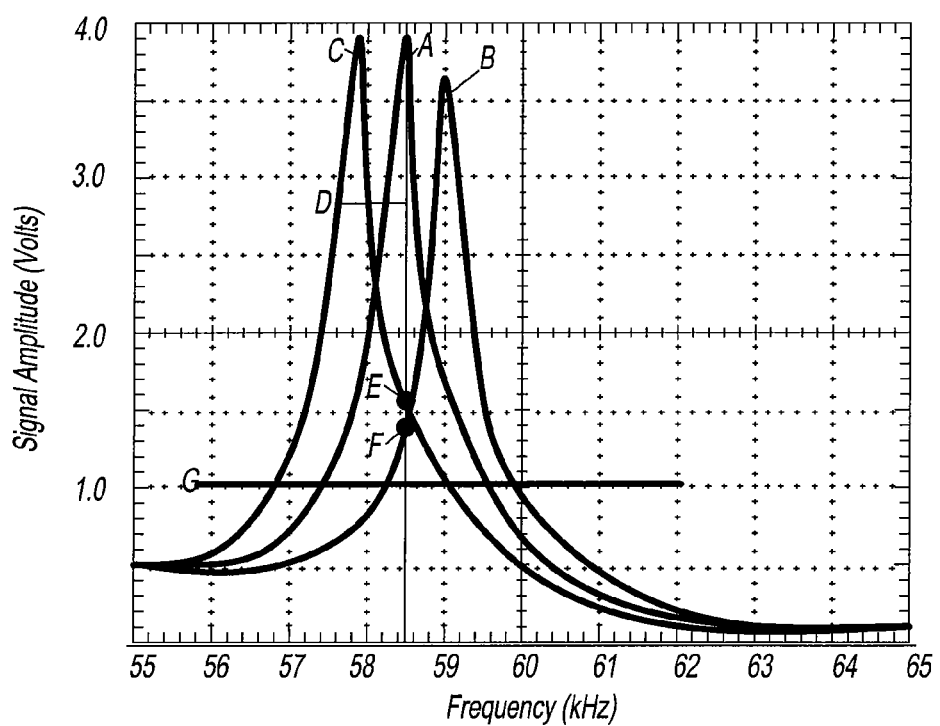
FIG. 15 is a second graph of a first, a second and a third resonance response of the discrete magneto mechanical pressure sensor of the present invention.

FIG. 15 shows the design parameters to be considered for a discrete sensor. The resonance curve A represents the ideal resonance response of the discrete sensor. Curves B and C represent resonance curves for the maximum resonant frequency shifts expected for the effects detailed above. The vertical line D dropped down from the peak of the ideal resonance curve intersects curves B and C on the shoulders of their curves at points E and F, respectively. The abscissa values for points E and F represent the response amplitude of the sensor to the ideal resonant frequency for the shifted resonance situations. The horizontal line G represents a threshold amplitude for the detection circuitry. The vertical line D intersects all three curves, A, B, and C above the detection threshold.

Multi-step discrete sensor systems employ a plurality of magneto-mechanical sensors 20 with each operating at different ideal resonant frequencies. The ideal frequency of each component step sensor is chosen such that the response to the ideal resonant frequency for a given step sensor is detectable over the range of expected resonant frequency shifts due to temperature and pressure. Each ideal resonant frequency is offset enough that other alternate step sensors' responses to that frequency, for the expected range of resonance shifts due to temperature and pressure, are below detection threshold. The ideal frequencies of the individual discrete step sensors can be selected by a number of methods know to those skilled in the art. The resonant frequency is related to the length of the magnetostrictive material as discussed. Individual sensors may be cut to different lengths affecting the offsets in resonant frequency.

Alternatively, the magnetostrictive elements of each discrete step are all the same length, and the shift in ideal resonant frequency is effected by the strength of the non alternating biasing magnetic field. If this biasing field for each step magneto-mechanical pressure sensor is implemented by the magnetically hard element 34, different field strengths may be realized by varying the distance of between the equally magnetically hard elements and magnetostrictive elements 38, by varying the strength of the magnetically hard elements using uniform spacing, or a combination approach.

In still yet another embodiment of the multi-step discrete magento-mechanical pressure sensor 20 design, each sensor operates at the same resonant frequency range in an on/off manner. Preferably, each sensor 20 begins to resonate when its individual pressure threshold is exceeded. The thresholds of the individual sensors are staircased in an increasing way such that a data interpretation algorithm of the data interpretation system 26 can infer the pressure by simply counting the number of resonant peaks detected per revolution of the tire 12.

It should be understood that the foregoing description is only illustrative of the present invention. Various alternatives and modifications can be devised by those skilled in the art without departing from the invention. Accordingly, the present invention is intended to embrace all such alternatives, modifications and variances.

What is claimed is:

1. An apparatus for monitoring a tire pressurization state in a tire, the apparatus comprising:
    a magneto-mechanical pressure sensor being in or on the tire;
    an electromagnetic excitation system for interrogating said magneto-mechanical pressure sensor;
    a receiver for receiving information from said electro magnetic excitation system; and
    a data interpretation system for translating said received information into the tire pressurization state, said data interpretation system being connected to a display to communicate the tire pressurization state to an operator.

2. The apparatus of claim 1, wherein said magneto-mechanical pressure sensor is in the tire in a location selected from the group consisting of in a wheel rim, beneath a tread, in a tire sidewall, on said tire sidewall, molded in a tire wall, in a complementary location to a centrifugal force of the tire when rotating, in a portion of a valve stem assembly, in any duct that accesses an internal air pressure of the tire, and any combinations thereof.

3. The apparatus of claim 1, wherein said magneto-mechanical pressure sensor has a linear motion mechanical sensing component, a magnetically hard element and a magnetostrictive element.

4. The apparatus of claim 3, wherein said magnetically hard element is connected to said linear motion mechanical sensing component, and wherein said magnetically hard element moves relative to said magnetostrictive element.

5. The apparatus of claim 3, wherein said magnetostrictive element has a first connected end and a second free end, said first end being connected to a location selected from the group consisting of a sensor housing, the tire, a mounting system and any combinations thereof.

6. The apparatus of claim 3, further comprising a component that deflects when exposed to a differential pressure and a reference pressure chamber, wherein said component is selected from the group consisting of a sealed diaphragm, a sealed bellows, a snap action member, and any combinations thereof.

7. The apparatus of claim 6, wherein said reference pressure chamber is selected from the group consisting of a sealed chamber, a sealed chamber having a pressurized gas therein, a tube communicating to ambient, a sealed indentation of the tire, and any combinations thereof.

8. An apparatus for monitoring a tire pressurization state in a tire, the apparatus comprising:
    a magneto-mechanical pressure sensor having a linear motion mechanical sensing component, a magnetically hard element and a magnetostrictive element, and a member in said magneto-mechanical pressure sensor, wherein said member toggles at a predetermined pressure differential from a first position to a second position, wherein said member allows said magnetostrictive element to move relative to said magnetically hard element at said first position, and said member changes a characteristic resonance of at least one of said magnetostrictive element and said magnetically hard element at a second position by a manner being selected from the group consisting of touching and preventing said magnetostrictive element from resonating relative to said magnetically hard element, changing a proximity of said magnetostrictive element relative to said magnetically hard element, changing a proximity of said magnetically hard element relative to said magnetostrictive element, dampening a vibration of said magnetically hard element, dampening a vibration of said magnetostrictive element, and any combinations thereof;
    an electromagnetic excitation system for interrogating said magneto-mechanical pressure sensor;
    a receiver for receiving information from said electro magnetic excitation system; and
    a data interpretation system for translating said received information into the tire pressurization state, said data interpretation system being connected to a display to communicate the tire pressurization state to an operator.

9. The apparatus of claim 8, wherein said member is a disc and contacts at least one of said magnetostrictive element and said magnetically hard element at an inflation pressure of the tire.

10. The apparatus of claim 8, wherein said member is a disc and allows at least one of said magnetostrictive element and said magnetically hard element to move at a second pressure being lower than an inflation pressure of the tire.

11. The apparatus of claim 8, wherein said member is a bi-stable snap acting disc.

* * * * *